(12) United States Patent
Dunning et al.

(10) Patent No.: US 9,989,102 B2
(45) Date of Patent: Jun. 5, 2018

(54) VENTED GAITER

(71) Applicant: Jaguar Land Rover Limited, Coventry (GB)

(72) Inventors: Emma-Claire Dunning, Coventry (GB); Edward Hoare, Coventry (GB); Laur Läänemets, Coventry (GB); Maelle Dodu, Coventry (GB); Thuy-Yung Tran, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 135 days.

(21) Appl. No.: 14/917,436

(22) PCT Filed: Sep. 12, 2014

(86) PCT No.: PCT/EP2014/069498
§ 371 (c)(1),
(2) Date: Mar. 8, 2016

(87) PCT Pub. No.: WO2015/036540
PCT Pub. Date: Mar. 19, 2015

(65) Prior Publication Data
US 2016/0223030 A1    Aug. 4, 2016

(30) Foreign Application Priority Data

Sep. 12, 2013 (GB) .................................. 1316248.2

(51) Int. Cl.
*F16D 3/84* (2006.01)
*B60C 23/00* (2006.01)
(Continued)

(52) U.S. Cl.
CPC ............ *F16D 3/845* (2013.01); *B60C 23/003* (2013.01); *F16J 3/046* (2013.01); *F16D 3/223* (2013.01);
(Continued)

(58) Field of Classification Search
CPC .... F16D 3/845; F16D 3/223; F16D 2003/846; Y10T 464/10; F16J 3/046; B60C 23/003
(Continued)

(56) References Cited

U.S. PATENT DOCUMENTS

| 4,529,213 A | 7/1985 | Goodman |
| 4,718,680 A | 1/1988 | Halconruy et al. |

(Continued)

FOREIGN PATENT DOCUMENTS

| FR | 2 843 931 A1 | 3/2004 |
| GB | 2 012 022 A | 7/1979 |

(Continued)

OTHER PUBLICATIONS

Combined Search and Examination Report, GB 1316248.2, dated Mar. 18, 2014, 7 pages.

(Continued)

*Primary Examiner* — Gregory J Binda
(74) *Attorney, Agent, or Firm* — Myers Bigel, P.A.

(57) ABSTRACT

A vented gaiter (6) for mounting to a shaft (4) comprises: a rim (34) defining an opening (33) for receiving the shaft (4); and a separate venting element (40). The venting element (40) is disposed within said opening (33). The shaft (4) is received in the opening (33), and the rim (34) is mounted to the shaft by means of a circular clamp (22). The venting element (40) is thus retained in place between the shaft (4) and the rim (34) and allows any air accumulated inside a CV joint enclosure (28) formed by the gaiter (6) when the gaiter (6) is mounted to the shaft (4) to vent axially according to a direction substantially parallel to the shaft longitudinal axis. The venting element (40) comprises a gas-permeable liquid-impermeable membrane (41).

12 Claims, 5 Drawing Sheets

(51) Int. Cl.
*F16J 3/04* (2006.01)
*F16D 3/223* (2011.01)

(52) U.S. Cl.
CPC ....... *F16D 2003/846* (2013.01); *Y10T 464/10* (2015.01)

(58) Field of Classification Search
USPC ........... 464/17, 173–175; 277/634–636, 918, 277/928; 55/385.3
See application file for complete search history.

(56) References Cited

U.S. PATENT DOCUMENTS

| | | | |
|---|---|---|---|
| 6,793,581 B2 * | 9/2004 | Meyer | F16D 3/223 464/17 X |
| 8,075,669 B2 | 12/2011 | Meindl et al. | |
| 2002/0025854 A1 | 2/2002 | Miller et al. | |
| 2007/0240537 A1 | 10/2007 | Basham | |
| 2011/0074119 A1 | 3/2011 | Deane et al. | |
| 2012/0067482 A1 | 3/2012 | Stech | |
| 2016/0199768 A1 * | 7/2016 | Dunning | B60C 23/003 55/385.3 X |

FOREIGN PATENT DOCUMENTS

| | | |
|---|---|---|
| GB | 2 348 857 A | 10/2000 |
| GB | 2516697 A | 2/2015 |
| WO | WO 2010/039244 A1 | 4/2010 |
| WO | WO 2015/014904 A1 | 2/2015 |

OTHER PUBLICATIONS

International Search Report and the Written Opinion, PCT/EP2014/069498, dated Jul. 15, 2015, 14 pages.

* cited by examiner

VENTED GAITER

RELATED APPLICATIONS

This application is a 35 U.S.C. § 371 national stage application of PCT Application No. PCT/EP2014/069498, filed on Sep. 12, 2014, which claims priority from Great Britain Patent Application No. 1316248.2 filed on Sep. 12, 2013, the contents of which are incorporated herein by reference in their entireties. The above-referenced PCT International Application was published in the English language as International Publication No. WO 2015/036540 A2 on Mar. 19, 2015.

TECHNICAL FIELD

The present disclosure relates to a vented gaiter for mounting to a shaft. Aspects of the present invention relate to a vented gaiter assembly; to a central tyre inflation system; to a vehicle; and to a method. Aspects of the present invention also relate to a venting element for venting air from a gaiter for mounting to a shaft, and to a gas-permeable liquid-impermeable membrane.

BACKGROUND OF THE INVENTION

The present invention was conceived in the context of central tyre inflation systems (CTISs). CTISs were originally developed for military applications, in particular for military applications concerning off-road military wheeled trucks and trailers. However, CTISs are nowadays incorporated into non-military vehicles such as specialist construction equipment and some agricultural vehicles.

A CTIS typically comprises one or more compressed air sources located on-board the vehicle and connected to one or more tyres. Tyre pressure can therefore be adjusted by operating the CTIS. Typically, a CTIS provides for delivery of compressed air to a tyre supply line. In some examples, a portion of the tyre supply line is integrated into a vehicle axle. Some axles comprise articulated joints formed by a driveshaft and a stub axle connected to form a constant velocity (CV) joint, and the tyre supply line extends through the CV joint. The CV joint is typically protected by a CV joint gaiter. An enclosure defined by the CV joint and the CV joint gaiter accommodates the bearing surfaces of the CV joint and a volume of a suitable lubricant such as grease with which to lubricate said bearing surfaces. This enclosure is known as the CV joint enclosure.

Air supplied through the CV joint to inflate or deflate the tyre may leak into the CV joint enclosure and thus inflate the gaiter. This is not desirable, and there is accordingly a need to prevent inflation of the gaiter.

As the CV joint enclosure accommodates grease to lubricate and protect moving parts, if an air permeable gaiter material was used as a replacement for a conventional gaiter material, grease deposits would be likely to prevent release of any pressure built up in the gaiter.

EP 2,007,500 B1 discloses a vent for an enclosure containing lubricated machinery.

U.S. Pat. No. 8,075,669 B2 discloses a gas-permeable oleophobic venting material.

WO 2010/039244 A1 discloses a clamping assembly for venting an enclosure having openings extending from the inside of the enclosure to the outside of the enclosure. A gas-permeable liquid-impermeable venting element is disposed to cover at least one hole in a band portion of the venting device. The at least one hole is at least partially aligned with an opening of the enclosure.

It is against this background that the present invention has been conceived. In at least certain embodiments, the present invention seeks to address shortcomings associated with the prior art or to improve parts, components, apparatus, systems and methods disclosed in the prior art.

SUMMARY

Aspects of the present invention relate to a vented gaiter for mounting to a shaft; to a vented gaiter assembly; to a central tyre inflation system; to a vehicle; to a method; to a venting element for venting air from a gaiter for mounting to a shaft; and to a gas-permeable liquid-impermeable membrane.

According to an aspect of the present invention there is provided a vented gaiter for mounting to a shaft, the gaiter comprising:
  a rim defining an opening for receiving the shaft; and
  a venting element;
    wherein the venting element is disposed within said opening.

The venting element can be disposed such that when the vented gaiter is mounted to the shaft the venting element is adjacent or proximal to the shaft, or in contact with the shaft. The venting element can be disposed such that, when the vented gaiter is mounted to the shaft, the venting element is directly or indirectly positioned between the rim and the shaft. The venting element can be disposed such that, when the vented gaiter is mounted to the shaft, an inner side of the rim holds the venting element in place on the shaft. Such holding in place can be for example by application of a pressure on the venting element exerted by the rim. The venting element can be held in place against the shaft. The rim, the opening and/or the venting element can be located at a longitudinal end of the gaiter. When the gaiter is mounted to the shaft, the venting element can be compressed between the rim and the shaft.

A venting passageway for venting gas can be defined when the vented gaiter is mounted to the shaft. The venting passageway can be defined in cooperation with the shaft. The venting passageway can be located adjacent or proximal to the shaft. The venting passageway can extend across the opening of the gaiter. The venting passageway can extend from the rim to the shaft when the vented gaiter is mounted to the shaft. The venting passageway can be located at an end of the gaiter. The venting passageway can have a cross-sectional shape of a circular crown. The venting element can be located within said venting passageway.

In some embodiments, the venting element can comprise a gas-permeable liquid-impermeable membrane, so that liquid (for example water and/or oil and/or grease) cannot enter or exit the membrane. In particular, the membrane can be air permeable. In some embodiments, the membrane can be oleophobic.

The venting element can comprise a membrane backing material. The backing material can be air permeable. The membrane backing material can extend across part or all the membrane. The membrane backing material can be directly in contact with the membrane or a suitable intermediate material can be used such as an adhesive. The backing material can have the same longitudinal shape and/or cross-section as the membrane. The backing material can be compressible and/or deformable. Alternatively, the backing material could resist deformation under compression. For example, the membrane backing material can be made from a porous foam. The foam can be compressible or it can be hard. The venting element and/or the membrane can be distally located with respect to a centre of the gaiter. The membrane can define an outer surface of the gaiter.

The venting element can be configured to vent generally axially when the vented gaiter is mounted to the shaft. In some embodiments, gas, such, as air is vented generally axially from inside the gaiter, i.e. generally in a direction parallel to a longitudinal axis defined by the shaft. In some embodiments, air is vented alongside the shaft. The venting passageway can extend axially.

The venting element can extend circumferentially to encompass or surround at least a portion of a surface of the shaft when the gaiter is mounted to the shaft. The shaft can comprise a portion having a generally circular cross-section. The venting element can extend around at least part of the inner side of the rim, or it can extend circumferentially around the whole inner side of the rim, or around the whole shaft. The rim can be circular.

The venting element, the membrane and/or the membrane backing material can be generally annular, band-shaped or generally toroidal. It will be understood that generally toroidal implies a radial thickness generally comparable with a longitudinal width, whereas annular or band-shaped may imply that said longitudinal width is greater than said radial thickness.

In some embodiments, the venting element and the rim can be coaxially arranged. Likewise, the passageway can be coaxial with the rim and the venting element.

The venting element can be provided integrally with the gaiter, for example it can be formed integrally with the gaiter or the venting element can be bonded to the gaiter, for example by means of an adhesive or ultrasonically. The venting element can be bonded to the rim, or the venting element can simply be shaped such that the venting element can be supported inside the rim, for example by interference fit. The venting element can, however, also be provided as a separate or separable component for cooperation with the gaiter and/or the shaft.

The vented gaiter can further comprise a baffle element configured, in use, to at least partially inhibit progress of lubricant (i.e. oil and/or grease) present inside the gaiter towards the venting element so that the venting element will less likely become partially or fully obstructed by the lubricant.

The baffle element can be gas-permeable. For example, the baffle element can be formed from an air permeable porous foam or a fibrous material.

The baffle element can be configured to be mounted to the shaft. However, the baffle element can alternatively be configured to be mounted to or on the gaiter. The baffle element could be mounted on an inner wall of the gaiter. The baffle element can be configured to be supported in cooperation by the gaiter and the shaft.

The baffle element can be provided separately from the gaiter, or it could be separable from the gaiter. However, the baffle element could be provided integrally with the gaiter.

The baffle element can extend radially. In some embodiments, the baffle element can extend within a pleat, or convolution, defined on the inner side/wall of the gaiter, so that a serpentine path is defined by the baffle element in cooperation with an inner portion of said convolution. The serpentine path can inhibit progress of lubricant/oil/grease towards the venting element.

In some embodiments, the baffle element can be configured to contact said inner portion of said convolution. In some embodiments, the baffle element can be configured to contact said inner portion of said convolution when no pressure gradient is present between an enclosure defined by the gaiter, when the gaiter is in use, and a space outside said enclosure. This is possible if the gaiter is made of a suitably flexible material, for example a wall made of a polymeric material (for example rubber), and, as such, the gaiter can expand radially under the action of an internal pressure. Said internal pressure can be generated by compressed air present inside the gaiter.

The gaiter can be in the shape of a bellows. The gaiter can be generally frusto-conical. The generally frusto-conical gaiter can have convoluted sides.

The baffle element can comprise a radially extending flange. The flange can be L-shaped or can have a generally L-shaped cross section.

The baffle element can extend circumferentially at least partially or around a whole circumference. In some embodiments, the baffle element can be generally annular or generally toroidal.

A spacer element, such as a cylindrical or tubular collar, can be provided between the venting element and the baffle element.

According to a further aspect of the present invention there is provided a vented gaiter for mounting to a shaft having a longitudinal axis, the gaiter comprising a venting element configured to vent gas in a direction generally parallel to said longitudinal axis of the shaft.

According to a further aspect of the present invention, there is provided a vented gaiter as described herein in combination with a clamp for clamping the vented gaiter to the shaft.

The clamp can comprise a band for cooperating with the rim. The band can be at least partially circumferential, or it can define a complete circumference.

According to a further aspect of the present invention there is provided a vented gaiter as described herein, in combination with the shaft.

The shaft can be a vehicle axle driveshaft.

According to a further aspect of the present invention there is provided a vented gaiter as described herein in combination with a wheel stub axle.

The driveshaft and the wheel stub axle can form a constant velocity (CV) joint.

The vented gaiter assembly can be mounted to a cup-shaped portion of the stub axle.

The vented gaiter can comprise first and second rims, each defining a respective opening. The first and second rims, and respective openings, can each be located at a distal end of the gaiter. The first rim can be mounted to the driveshaft; the second rim can be mounted to the cup-shaped portion of the stub axle. The venting element can be disposed in the opening defined by said first rim. Thus, the venting element can be disposed between the driveshaft and the gaiter. The driveshaft and the stub axle can form a CV joint. The CV joint can be enclosed in the enclosure defined by the gaiter when the gaiter is mounted to the CV joint (herein also referred to as the CV joint enclosure). A volume of lubricant, such as oil and/or grease can be provided inside the CV joint enclosure to lubricate the CV joint.

The driveshaft and/or the stub axle can comprise a conduit for passage of compressed air. The conduit can extend along a longitudinal axis. The longitudinal axis can be a central axis of the driveshaft and/or stub axle, i.e. the longitudinal axis can extend at least generally centrally through the driveshaft and/or stub axle. The longitudinal axis can be a symmetry axis of the driveshaft and/or stub axle, i.e. the driveshaft and/or stub axle can extend at least substantially symmetrically around the longitudinal axis. The CV joint can comprise a compressed air line formed through the CV joint. The compressed air line can comprise said conduit(s). The CV joint can comprise a compressed air transfer device for transferring compressed air from the driveshaft conduit to the stub axle conduit. The compressed air transfer device can be a flexible hose. The flexible hose can have first and second ports in fluid communication with, respectively, the driveshaft and stub axle conduits. A seal can be formed by the flexible hose and each of the conduits, for example by means of a resilient member such as a rubber O-ring.

According to a further aspect of the present invention there is provided a central tyre inflation system (CTIS) comprising a vented gaiter as described herein.

According to a further aspect of the present invention, there is a provided a vehicle comprising a CTIS as described herein.

According to a further aspect of the present invention, there is provided a method of mounting a vented gaiter to a shaft, the method comprising:
  providing a gaiter comprising:
    a rim defining an opening for receiving the shaft; and
    a venting element disposed within said opening;
  receiving the shaft through said opening; and
  securing the rim and the venting element to the shaft.

The method can comprise mounting the gaiter to the shaft by means of a clamp as described herein. The clamp can be circumferentially constrictive. The circumferentially constrictive clamp can be a band clamp.

According to a further aspect of the present invention, there is provided a venting element for venting air from a gaiter for mounting to a shaft, wherein the venting element is configured to be disposed within an opening for receiving a shaft defined by a rim of the gaiter. Said venting element can have a generally annular or toroidal shape. The venting element can comprise a gas-permeable liquid-impermeable membrane. The membrane can be air permeable. The membrane can be oleophobic.

According to a further aspect of the present invention there is provided a gas-permeable liquid-impermeable membrane generally in the shape of a ring, or a circular crown (a circle with an inner circle removed).

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the present invention will now be described, by way of example only, with reference to the accompanying figures, in which.

DETAILED DESCRIPTION OF AN EMBODIMENT

Figure 1:
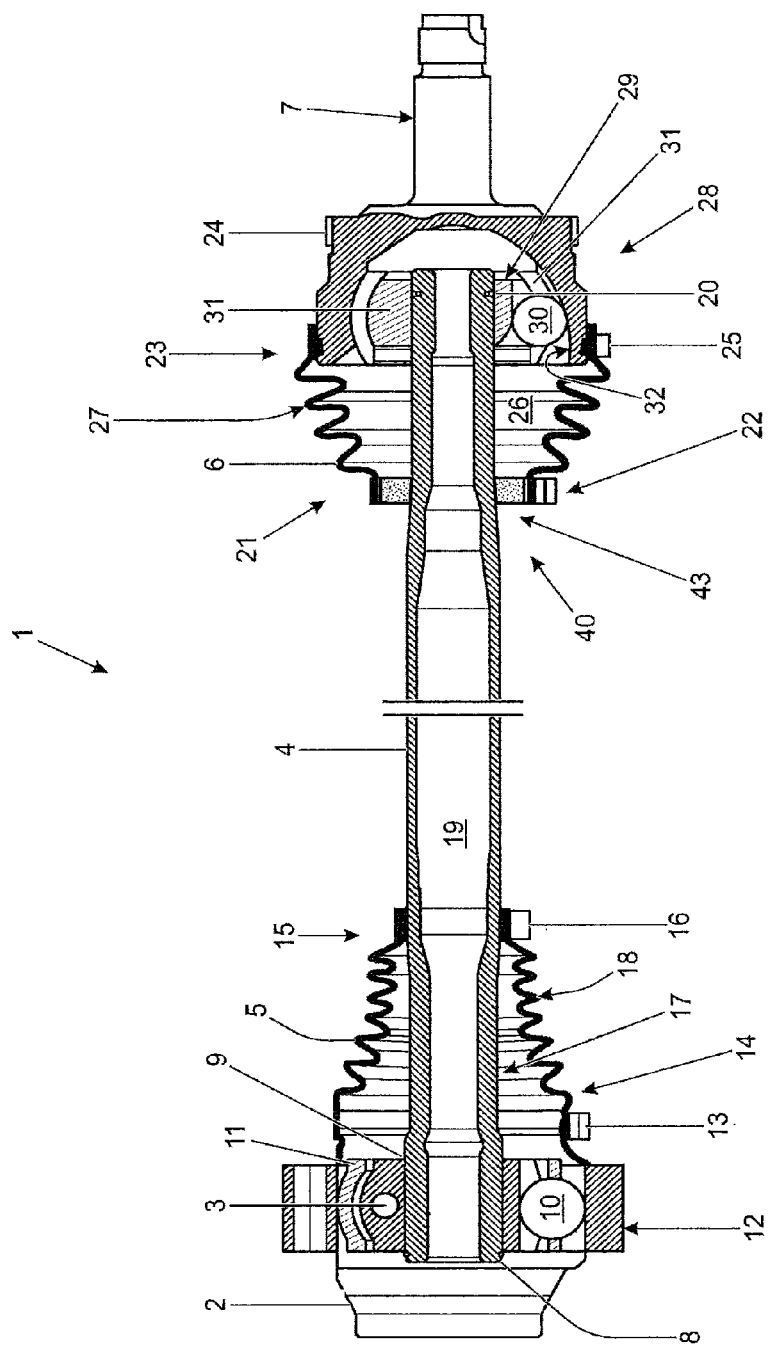
FIG. 1 is a cross sectional side elevation of an axle assembly comprising a vented gaiter according to an embodiment of the present invention.

Referring to FIG. 1, an automotive axle assembly 1 comprises: an inner tubular portion 2; a ball bearing 3; a driveshaft 4; an inner gaiter 5; an outer gaiter 6; and a wheel stub axle 7. The driveshaft 4 and the stub axle 7 are coupled to form a constant velocity (CV) joint 28. The inner tubular portion 2 leads to a differential gearbox (not shown) located proximal to an inner end of the assembly 1. The wheel stub axle 7 is connected to a vehicle wheel (not shown) located at an outer end of the assembly 1. The CTIS, tyre and wheel are not shown in the drawings and are of the type described in the co-pending patent application number GB1313622.1 filed on 30 Jul. 2013.

The differential gearbox transmits torque to the driveshaft 4. A first end 8 of the driveshaft 4 is coupled to an inner bearing race 9. The ball bearing 3 comprises a set of steel balls 10 spaced by a cage 11, which rotate on an outer bearing race 12. An inner end portion 14 of the inner gaiter 5 is fixed to the inner tubular portion 2 by means of a first circular clamp 13, in a conventional manner. An outer end portion 15 of the inner gaiter 5 is fixed to the driveshaft 4, also in a conventional manner, by means of a second circular clamp 16. A first enclosure 17 is formed between a pleated or convoluted wall 18 of the inner gaiter 5, the driveshaft 4 and the inner tubular member 2. The first enclosure 17 contains grease which lubricates the moving, contacting parts of the ball bearing 3.

Figure 5:
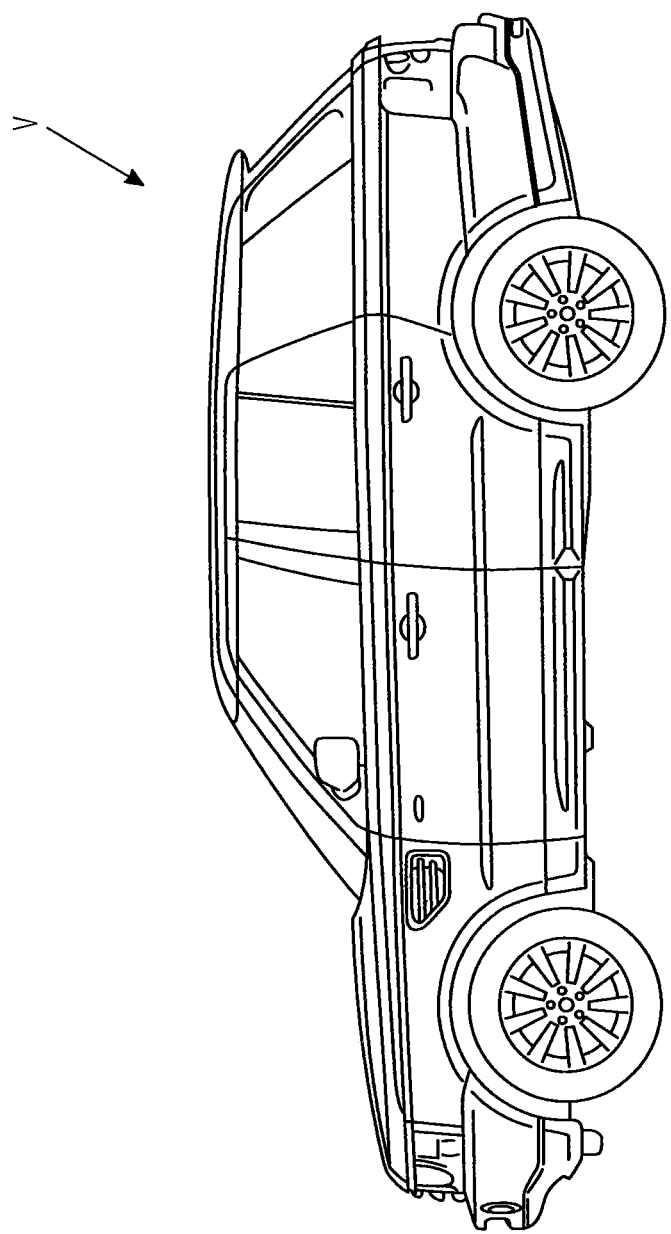
FIG. 5 illustrates a vehicle that may include embodiments of the present invention.

As shown in FIG. 1, a central conduit 19 extends axially inside the driveshaft 4, from the driveshaft first end 8 to a driveshaft second end 20. The central conduit 19 allows compressed air to flow inside the axle assembly 1 towards the wheel. The compressed air is used to inflate a tyre (not shown) mounted on the wheel (also not shown). As it will be apparent, the axle assembly 1 is part of a CTIS (FIG. 2) installed in a vehicle V (FIG. 5). The CTIS allows tyre pressure to be monitored and adjusted from on-board the vehicle V. An on-board source of compressed air associated with the CTIS is provided for tyre inflation operations.

In this embodiment, an inner end portion 21 of the outer gaiter 6 is mounted to the driveshaft 4 by means of a third circular clamp 22. An outer end portion 23 of the outer gaiter 6 is mounted to a cup-shaped portion 24 of the stub axle 7 by means of a fourth circular clamp 25. It will be appreciated that both these end portions 21, 23 are mounted conventionally. A second enclosure 26 is defined inside the outer gaiter 6. This second enclosure 26 contains grease for lubricating the moving parts of the constant velocity (CV) joint 28 and the bearing surfaces of the CV joint 28, and, as such, is also herein referred to as the CV joint enclosure 26. A wall 27 is formed by a plurality of convolutions arranged to permit free movement of the CV joint 28 and not hinder joint articulation or suffer unnecessary stresses of the outer gaiter 6 itself, in use. The CV joint enclosure 26 is delimited by the pleated or convoluted wall 27 of the outer gaiter 6, the driveshaft second end 20 and the cup-shaped portion 24 of the stub axle 7. The CV joint 28 is formed by the driveshaft 4 and the stub axle 7. As seen in FIG. 1, a CV joint race 29 is mounted to the driveshaft second end 20; a second set of steel balls 30 are separated by a second cage 31. The steel balls 30 rotate on an inner race side 32 defined in the cup-shaped portion 24 of the stub axle 7. The CV joint 28 shown in FIG. 1 and described herein is arranged to articulate whilst transmitting torque from the driveshaft 4 to the stub-axle 7 in the usual manner, well known in the art.

Similar to the driveshaft 4, the stub axle 7 comprises a second conduit (not shown) for the passage of compressed air. The first conduit 19 and the second conduit are in fluid communication with each other by means of a flexible hose (not shown) located within the second enclosure 26 partly inserted in each of the first and second conduits. A seal is present at each end of the flexible hose for fluidly sealing passage of compressed air from, respectively, the first conduit 19 into the flexible hose, and from the flexible hose into the second conduit. Patent application GB 1313625.4, which was filed by the applicant on 30 Jul. 2013, describes an alternative vehicle axle assembly for a CTIS wherein the passage of compressed air is through a rotatable fluid transfer device. In time, some compressed air may leak from said compressed air supply line into the gaiter enclosure 26. This problem is mitigated by the presence of a venting element disposed within the outer gaiter 6. The outer gaiter 6 is therefore a vented gaiter. The vented outer gaiter 6 vents excess air accumulated inside the second enclosure 26. In the described embodiment, the venting element is an annular breather 40.

Figure 2:
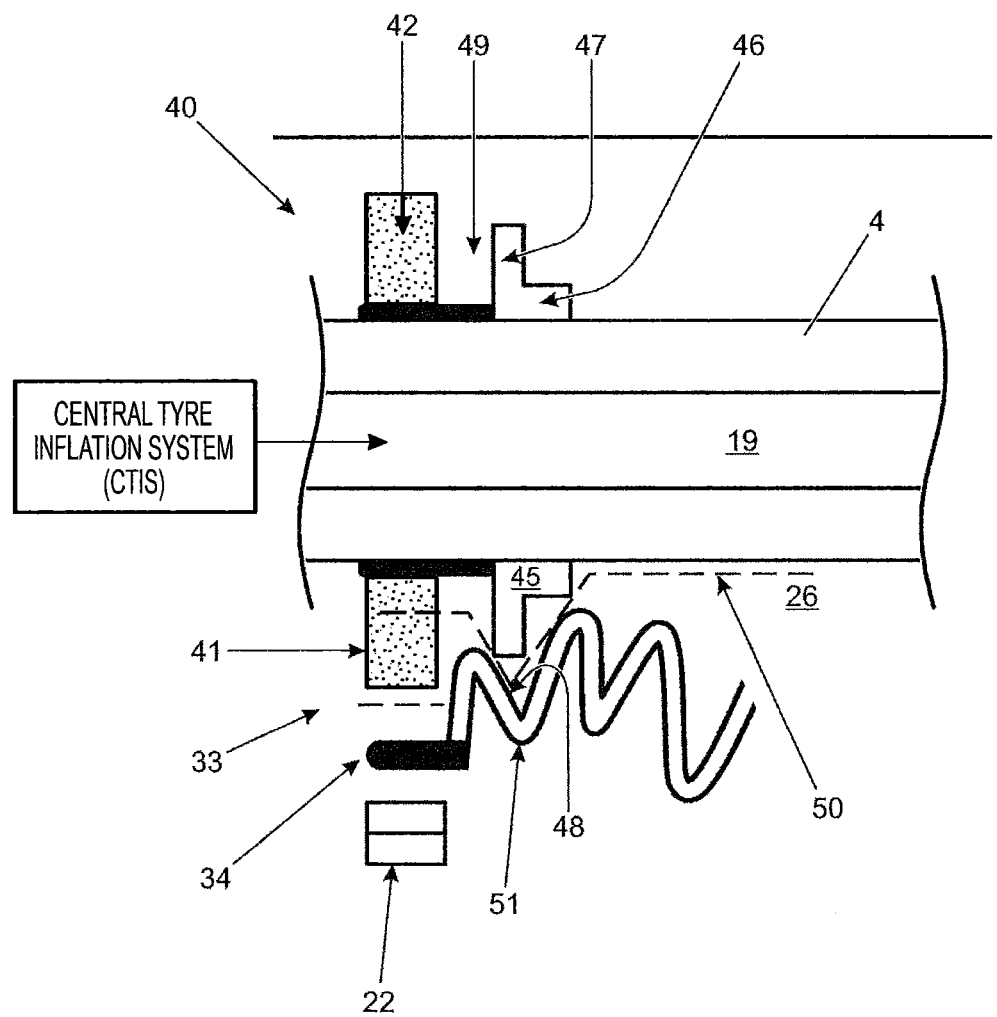
FIG. 2 is an enlarged cross sectional representation showing the mounting arrangement of the vented gaiter of FIG. 1.

The annular breather, which is shown enlarged in FIG. 2, comprises a gas-permeable liquid-impermeable membrane 41 and a membrane backing material 42. In the described example, the membrane 42 is manufactured from PTFE. Suitable membrane materials can be obtained from WL Gore & Associates, Inc. Due to its microscopic structure, the membrane 41 is also oleophobic, i.e. the membrane 41 acts to actively repel any oily or greasy substance. U.S. Pat. No. 8,075,669 B2 discloses suitable materials.

From a geometrical viewpoint, the membrane 41 is in the shape of a thin sheet of material cut in the shape of a ring (or circular crown, defining a larger circle with an inner circle removed). It will be apparent that, in the described example, the inner diameter of the membrane 41 is substantially equivalent to the diameter of the driveshaft 4, and the outer diameter of the membrane 41 is substantially equivalent to the diameter of an opening 33 defined by a rim 34 of the outer gaiter 6. The opening 33 and the rim 34 are configured to receive the driveshaft 4 and the annular breather 40. The membrane 41 extends circumferentially around the surface of the driveshaft 4, and is located, in this example, exactly at the edge of the rim 34 of the vented gaiter 6. Supported by the membrane backing material 42, the membrane 41 radially extends from the driveshaft 4 to the gaiter rim 34.

The function of the membrane backing material 42, which, in the described embodiment, is made from a rigid, gas-permeable porous foam, is to provide support to the membrane 41; to receive and transmit to the driveshaft 4 the clamping force exerted by the third circular clamp 22 (shown loosened for clarity); and to screen the membrane 41 from grease. The membrane backing material backs the membrane 41 from the membrane inner side. Since the membrane backing material 42 is porous, air can travel towards the membrane 41. However, the backing material also physically inhibits flow of grease towards the membrane 41. In this embodiment, the backing material 42 is also annular, or, more specifically, toroidal, i.e. in the shape of a ring having a radial thickness generally comparable with the axial/longitudinal extension. The backing material 42 has an inner diameter of generally the same dimension as the diameter of the driveshaft 4, and an outer diameter of generally the same dimension as the diameter of the gaiter opening 33. The width of the backing material is generally the same as the width of the rim 34 of the gaiter 6.

The annular breather 40 is thus mounted between the driveshaft 4 and the rim 34 of the vented gaiter 6, as shown in FIG. 1. The annular breather 40 is compressed and kept in place by the third circular clamp 22. A venting passageway 43 is formed only when the breather 40 and the gaiter 6 are mounted to the driveshaft 4. The annular breather 40 extends to cover the venting passageway 43 so defined, so that leaked compressed air can be vented out from the enclosure 26 generally axially along the driveshaft 4, i.e. generally in the direction of the driveshaft longitudinal axis.

Particulars of the mounting arrangement of the annular breather 40 on the driveshaft 4 are shown enlarged in FIG. 2. The third circular clamp 22, shown loose in the Figure is tightened so as to apply a radial compression over the rim 34 of the vented gaiter 6 which in turns transmits said compression to the backing material 42 which supports the membrane 41. Since the membrane 41 is gas-permeable and liquid-impermeable, air can vent through said membrane 41, but water is prevented from entering the gaiter enclosure 26 from outside. Likewise, grease is prevented from leaking outside the same enclosure 26. Further, since the membrane 41 is oleophobic, grease is in addition repelled by the membrane 41. FIG. 2 shows that, in this embodiment, a baffle element in the form of a baffle collar 45 is also disposed inside the vented gaiter 6, adjacent the annular breather 40 and the gaiter rim 34.

In the described embodiment, the baffle collar 45 is in the shape of a ring having an L-shaped cross-section, as seen in FIG. 2. More specifically, the baffle collar 45 consists of an inner ring 46 for mounting to the driveshaft 4. Extending radially from said inner ring 46 is a flange 47. In this embodiment, the baffle collar 45 is made of the same material of the membrane backing material 42, i.e. it is formed from a hard porous foam. Similar to the backing material 42, the baffle collar 45 thus allows the passage of air therethrough whilst inhibiting flow of grease from the second enclosure 26 towards the membrane 41. It will be appreciated that, in use, the CV joint 28 rotates and the grease (not shown) is therefore pushed radially towards the wall 27 of the gaiter 6 by centrifugal force. The baffle collar 45 complements the action of said centrifugal force to prevent at least significant amounts of grease to locate in a space 49 defined between the annular breather 40 and the baffle collar 45.

The flange 47 of the baffle collar 45 extends radially into a convolution (or pleat) 51 formed by the convoluted wall 27 of the vented gaiter 6. Thus a serpentine path 50 is formed inside the gaiter 6 which further inhibits possible progress of the internal lubricant (i.e. the grease) towards the venting element 40. In particular, in the described embodiment, the flange 47 extends to contact an inner side 48 of the convoluted wall 27 of the vented gaiter 6 when no pressure gradient is present across the convoluted wall 27. Thus, when compressed air leaks into an interior of the second enclosure 26 the vented gaiter 6 expands and the inner side 48 of the wall 27 becomes displaced from the flange 47. When the vented gaiter 6 inflates, even slightly, under the action of leaked compressed air accumulating inside the gaiter 6, the inner side 48 of the wall 27 is lifted off an edge of the radially extending flange 47 of the baffle collar 45, and the serpentine path 50 can accordingly accommodate additional flow of air from the enclosure 26 towards the breather 40. Progress of grease, which might otherwise block the breather 40, is still satisfactorily inhibited since the rotation of the CV joint 28, as previously mentioned, tends to displace the grease radially, which slows or inhibits any potential longitudinal travel or migration of the grease in use. If any grease passes through the serpentine path 50, it will eventually be blocked by the membrane backing material 42.

Figure 3:
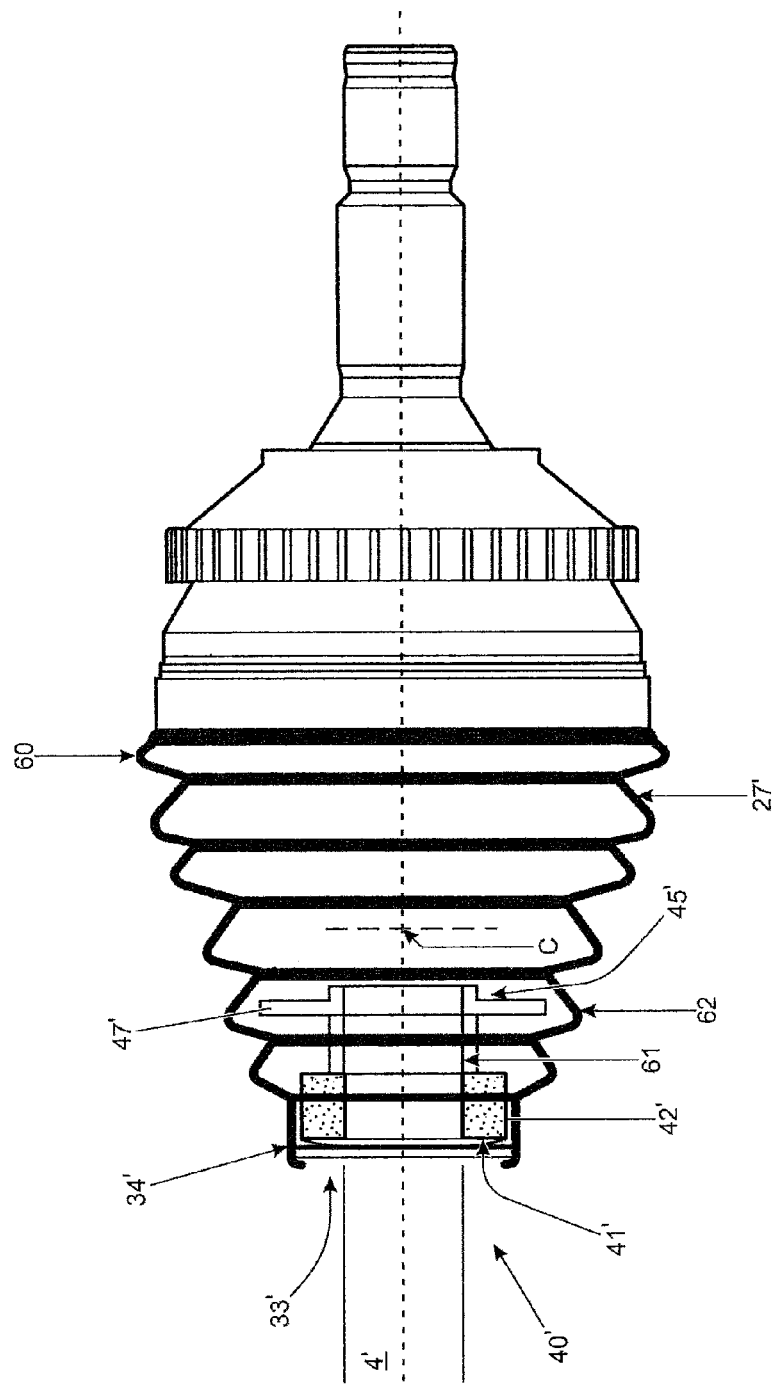
FIG. 3 is a side elevation of a portion of an axle assembly according to an embodiment of the present invention, with the vented gaiter profile in outline.

FIG. 3 shows a vented gaiter 60 according to a second embodiment of the present invention. Like reference numerals are used to describe like components in this embodiment, albeit suffixed with a single quotation mark to aid clarity. The vented gaiter 60 comprises a venting element in the form of an annular breather 40', a spacer 61 and a baffle collar 45', disposed in this sequence along the driveshaft 4' proceeding from the gaiter opening 33' inwardly towards a centre C' of the gaiter 60. It will be appreciated that in this embodiment the breather 40' is slightly axially more inwardly disposed with respect to the gaiter rim 34' compared with the breather 40 of the previous embodiment. The membrane 41' is disposed on the outer side of the membrane backing material 42'. The spacer 61 is in the form of a cylindrical tubular member which keeps the baffle collar 45' at a predetermined distance with respect to the breather 40'. The baffle collar 45' has a radially extending flange 47' which extends into a convolution 62 formed by the convoluted wall 27' of the vented gaiter 60. The flange 47' extends into the convolution 62. The convolution 62 is the second counting the gaiter convolutions starting from the gaiter rim 34'. Accordingly, a radially wider baffle collar 45' is accommodated in this vented gaiter 60 compared to the baffle collar 45 of the previous vented gaiter 6.

Figure 4:
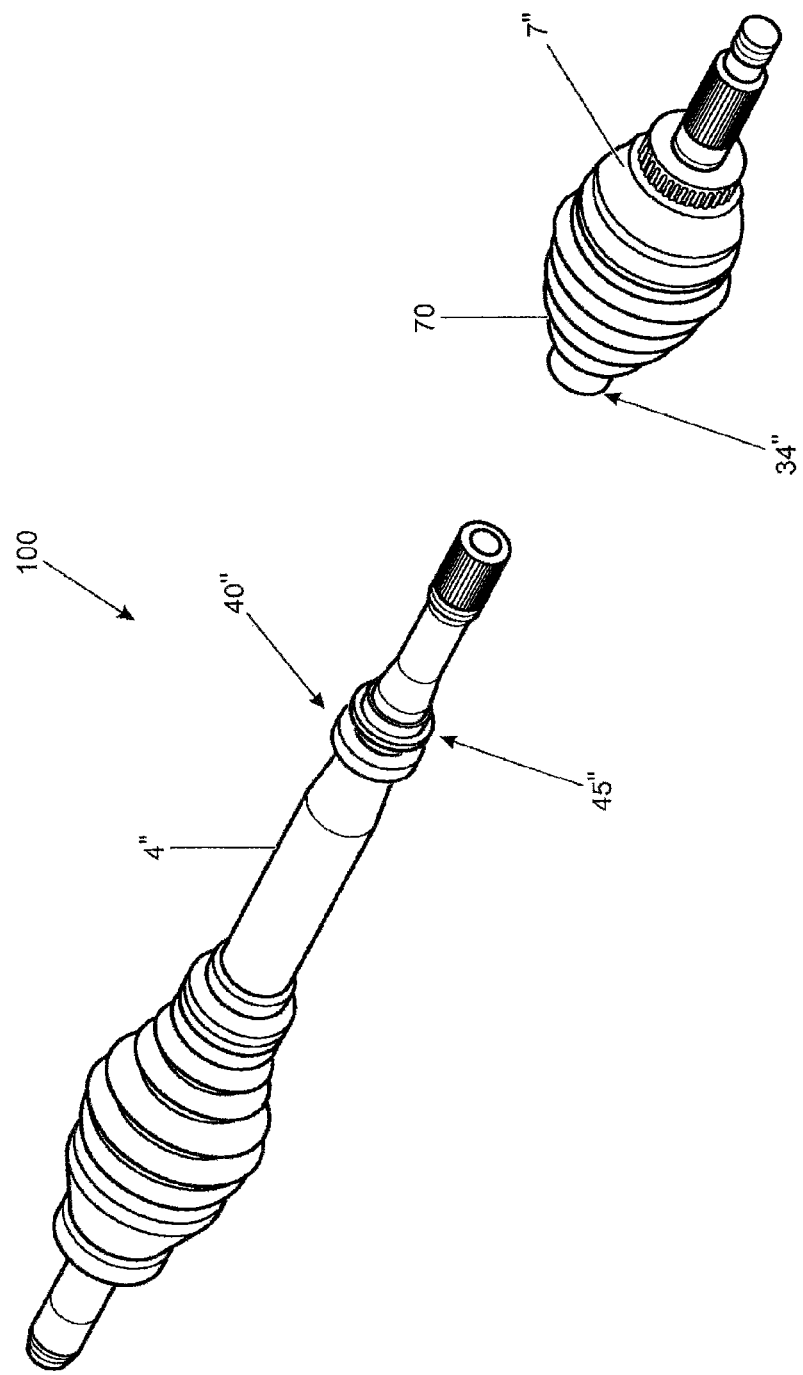
FIG. 4 is an exploded perspective view of an axle assembly according to an embodiment.

FIG. 4 shows an exploded view of an axle assembly 100 according to a further embodiment of the present invention. Like reference numerals are used to describe like components in this embodiment, albeit suffixed with a double quotation mark to aid clarity. In FIG. 4, a venting element in the shape of an annular breather 40" is depicted while mounted on a driveshaft 4". The breather 40" is essentially equivalent to the breathers 40, 40' described herein since a gas-permeable liquid-impermeable membrane 41" is disposed on a side of the breather 40" against a porous gas-permeable backing material 42" so that in use air can be vented out through the breather 40" whilst grease is prevented from contaminating the membrane 41" internally. A baffle element in the form of a baffle collar 45" is also mounted to the driveshaft 4", next to the breather 40". The breather 40" and the baffle collar 45" are mounted to the driveshaft 4" before a conventional gaiter 70 is also fitted to the driveshaft 4" by clamping the gaiter rim 34" around the breather 40" by means of a constrictive circular clamp (not shown). This is possible because the breather 40" and the baffle collar 45" are provided in this embodiment as separate and separable components with respect to the gaiter 70. This facilitates installation. However, it will be appreciated that in alternate embodiments, the breather 40", the baffle collar 45" and/or the membrane 41" could be provided integrally with the gaiter 70. For example, the breather 40", the baffle collar 45" and/or the membrane 41" could be attached to the gaiter 70 by means of an adhesive, or ultrasonically. Once the driveshaft 4" is fitted to a stub axle 7", the assembly 100 can no longer be taken apart.

The invention claimed is:

1. A vented gaiter for mounting to a shaft, the gaiter comprising:
    a rim defining an opening for receiving the shaft; and
    a venting element disposed within the opening, wherein the venting element comprises a gas-permeable, liquid-impermeable membrane that is oleophobic, wherein the vented gaiter further comprises a baffle element configured to at least partially inhibit progress of a lubricant from inside the vented gaiter towards the venting element,
    wherein the baffle element is gas-permeable,
    wherein the baffle element extends radially, and
    wherein the baffle element extends within a convolution defined on an inner side of the vented gaiter.

2. The vented gaiter of claim 1, wherein the venting element comprises a membrane backing material, and wherein the backing material comprises a porous foam.

3. The vented gaiter of claim 2, wherein the membrane defines an outer surface of the vented gaiter.

4. The vented gaiter of claim 1, wherein the vented gaiter is configured such that a venting passageway for venting gas is defined when the vented gaiter is mounted to the shaft, and wherein the venting element is disposed within the passageway.

5. The vented gaiter of claim 1, wherein the venting element is configured to vent generally axially.

6. The vented gaiter of claim 1, wherein the venting element extends circumferentially, and wherein the venting element is generally annular or generally toroidal.

7. The vented gaiter of claim 1, wherein the venting element and the rim are coaxial.

8. The vented gaiter of claim 1, wherein the venting element is separable from the vented gaiter.

9. The vented gaiter according to claim 1, wherein the baffle element is configured to contact the inner side when no pressure gradient is present across the vented gaiter, and wherein the baffle element is generally annular or generally toroidal.

10. The vented gaiter of claim 1, in combination with a clamp configured to attach the vented gaiter to the shaft, wherein the clamp comprises a band for cooperating with the rim of the vented gaiter.

11. A central tyre inflation system (CTIS), comprising:
    an axle assembly comprising a shaft and a vented gaiter, wherein the vented gaiter is attached to the shaft via a clamp;
    wherein the vented gaiter comprises a rim defining an opening for receiving the shaft;
    wherein the clamp comprises a band for cooperating with the rim of the vented gaiter;
    a venting element disposed within the opening, wherein the venting element comprises a gas-permeable, liquid-impermeable membrane that is oleophobic; and
    a baffle element configured to at least partially inhibit progress of a lubricant from inside the vented gaiter towards the venting element, wherein the baffle element is gas-permeable, wherein the baffle element extends radially, and wherein the baffle element extends within a convolution defined on an inner side of the vented gaiter.

12. A vehicle, comprising:
    a shaft;
    a vented gaiter comprising a rim defining an opening for receiving the shaft;
    a venting element disposed within the opening, wherein the venting element comprises a gas-permeable, liquid-impermeable membrane that is oleophobic; and
    a baffle element configured to at least partially inhibit progress of a lubricant from inside the vented gaiter towards the venting element, wherein the baffle element is gas-permeable, wherein the baffle element extends radially, and wherein the baffle element extends within a convolution defined on an inner side of the vented gaiter.

* * * * *